(12) United States Patent
Sakou et al.

(10) Patent No.: US 7,878,335 B2
(45) Date of Patent: Feb. 1, 2011

(54) METHOD AND DEVICE FOR SORTING IRREGULARLY SHAPED ARTICLES

(75) Inventors: Shigeto Sakou, Hyogo (JP); Satoshi Yamaguchi, Hyogo (JP); Shiyuzo Miwa, Hyogo (JP); Tatsutoshi Kitamoto, Hyogo (JP); Toshimitsu Kanoyadani, Kanagawa (JP)

(73) Assignee: Sansei Foods Co., Ltd., Hyogo (JP)

( * ) Notice: Subject to any disclaimer, the term of this patent is extended or adjusted under 35 U.S.C. 154(b) by 50 days.

(21) Appl. No.: 11/922,212

(22) PCT Filed: Jun. 16, 2006

(86) PCT No.: PCT/JP2006/312560

§ 371 (c)(1),
(2), (4) Date: Dec. 13, 2007

(87) PCT Pub. No.: WO2006/135111

PCT Pub. Date: Dec. 21, 2006

(65) Prior Publication Data

US 2010/0193335 A1     Aug. 5, 2010

(30) Foreign Application Priority Data

Jun. 17, 2005     (JP) .............................. 2005-178635

(51) Int. Cl.
*B65G 47/256*     (2006.01)
*B07C 5/06*     (2006.01)

(52) U.S. Cl. ...................... 209/529; 209/545; 209/693; 198/620; 198/626.1

(58) Field of Classification Search ................. 209/523, 209/529, 545, 638, 693; 198/620, 626.1
See application file for complete search history.

(56) References Cited

U.S. PATENT DOCUMENTS

| 5,641,072 | A  | * | 6/1997 | Otake ......................... 209/524 |
| 6,776,279 | B2 | * | 8/2004 | Krull et al. ................ 198/626.5 |
| 7,407,056 | B2 | * | 8/2008 | Lutz ........................... 209/617 |

FOREIGN PATENT DOCUMENTS

| JP | 1-94313   | 6/1989  |
| JP | 4-69473   | 6/1992  |
| JP | 7-315331  | 12/1995 |

* cited by examiner

*Primary Examiner*—Douglas A Hess
(74) *Attorney, Agent, or Firm*—Weingarten, Schurgin, Gagnebin & Lebovici LLP (57) ABSTRACT

There exists a demand for providing a method and apparatus capable of sorting articles whose upper and lower attitudes are inverted, in a simple and positive manner, from among different-formed articles such as candies having upper and lower portions different in outside diameter. To meet such a demand, different-formed articles having upper and lower portions different in outside diameter are fed between a pair of right and left slant members from a start end side of the same members, the slant members being arranged at a width narrower than a maximum diameter of the different-formed articles and wider than a minimum diameter of the different-formed articles and in such a manner as to be low on the start end side and high on a terminal end side thereof, then only the articles having upper portions larger in diameter than respective lower portions are caught on the pair of slant members, while the articles having upper portions smaller in diameter than respective lower portions are allowed to pass as they are, thereby sorting the both of them.

4 Claims, 8 Drawing Sheets

27# METHOD AND DEVICE FOR SORTING IRREGULARLY SHAPED ARTICLES

FIELD OF ART

The present invention relates to a sorting method for discharging articles of a vertically inverted attitude to the exterior from a conveyance path while conveying articles such as, for example, confections having upper and lower portion different in diameter in a predetermined direction, arranging only the articles of a normal vertical attitude in order and feeding them to a succeeding process, as well as an different-formed article sorting apparatus suitable for use in the method.

BACKGROUND ART

In case of packing such articles as candies into a case, first a large amount of articles are introduced into an aligner/feeder such as a parts feeder, in which the articles are arranged in a row, then the thus-arranged articles are conveyed in a predetermined direction to a succeeding conveyor. The articles thus conveyed in a row by the conveyor are then packed into a case by an encasing machine in series. As aligners, various types of aligners are used, including a shaking type and a rotary disc type. As an aligner for use in alignment and conveyance of confectionery, there is known, for example, such an aligner as is disclosed in Patent Document 1.

[Patent Document 1]

Japanese Patent Laid-Open Publication No. Hei 7 (1995)-315331

In Patent Document 1 there are described a method and apparatus for aligning and conveying plate-like processed food such as rice crackers, snacks and biscuits by utilizing vibration. However, practical method and apparatus for sorting and conveying different-formed articles of a vertically inverted attitude and having upper and lower portions different in diameter have not been developed yet.

DISCLOSURE OF THE INVENTION

Problem to be Solved by the Invention

Among confections such as candies there are included not only those of a columnar or cubic shape but also those having upper and lower portions different in outside diameter and those having a vertically inclined outer periphery surface. It may be possible to feed out these different-formed articles in a row with use of an aligner such as, for example, a parts feeder. However, those vertically inverted in attitude are fed out as they are, so in order to carry out a succeeding process such as a packing process smoothly it is necessary to arrange their vertical attitude orderly with use of certain means. In this case, if such a vertical attitude of articles being conveyed in a continuous manner is to be corrected manually, a complicated work requiring a large amount of labor is needed, thus giving rise to problems that not only the cost increases but also such a work is inefficient.

The present invention has been accomplished in view of the above-mentioned problem and it is object of the invention to provide a sorting method capable of sorting out different-formed articles of a vertically inverted attitude from those of a normal attitude included in different-formed articles having upper and lower portions different in outside diameter and then feeding out only those of a normal attitude to a succeeding process, as well as a sorting apparatus suitable for use in said method.

Means for Solving the Problem

The present invention adopts the following constructions for solving the above-mentioned problems. According to an different-formed article sorting method in a first aspect of the present invention, different-formed articles having upper and lower portions different in outside diameter are fed between a pair of right and left slant members from a start end side of the slant members, the slant members being disposed at a width smaller than a maximum diameter of the different-formed articles and larger than a minimum diameter of the different-formed articles and in such a manner that the start end side thereof is lower than a terminal end side thereof, only the articles large in diameter of their upper portions are caught on the pair of slant members, the articles small in diameter of their upper portions are allowed to pass as they are, thereby sorting the both of them by diameter.

According to an different-formed article sorting apparatus in a second aspect of the present invention there are provided a conveyance device for conveying different-formed articles having upper and lower portions different in outside diameter in a predetermined direction and a pair of right and left slant member disposed along and over the conveyance device, the pair of slant members being inclined so as to be lower on a start end side thereof than an upper end of the articles on the conveyance device and becomes higher gradually toward a terminal end side thereof, and the spacing between the pair of right and left slant members being wider than a minimum diameter of the articles being conveyed by the conveyance device and narrower than a maximum diameter of the said articles.

According to an different-formed article sorting apparatus in a third aspect of the present invention, in combination with the different-formed article sorting apparatus described in the above second aspect of the present invention, the slant members are a pair of belts adapted to travel in the same direction as the conveyance device. As the belts, there may be used, for example, round belts or chains.

EFFECTS OF THE INVENTION

According to the different-formed article sorting method in the first aspect of the present invention, by passing different-formed articles having upper and lower portions different in diameter between the pair of right and left slant members, only the articles whose upper portions are small in diameter pass between the slant members, while the articles whose upper portions are large in diameter are caught between the slant members and lifted, so those whose upper and lower attitudes are inverted and those of a normal attitude can be sorted in a simple and positive manner by diameter.

The different-formed article sorting apparatus in the second aspect of the present invention is an apparatus for implementing the sorting method described in the first aspect of the present invention. According to this apparatus, different-formed articles whose upper and lower attitudes are inverted can be sorted while being conveyed in a continuous manner. Further, according to the invention described in the third aspect of the present invention, a pair of right and left belts is used as the slant members and is allowed to travel in the same direction as the conveyance device (conveyor 3 in the illustrated example) which conveys the articles in a predetermined direction. Therefore, the caught articles, i.e., the articles whose upper and lower attitudes are inverted, can be taken out continuously from the conveyance device.

BRIEF DESCRIPTION OF THE DRAWINGS

FIG. 6 comprises a plan view (a), a front view (b), a side view (c) and a perspective view (d), showing an example of an article shape.
FIG. 7 comprises a plan view (a), a front view (b), a side view (c) and a perspective view, (d), showing an article shape different from the above article shape.
FIG. 8 comprises a plan view (a), a front view (b), a side view (c) and a perspective view (d), showing another different article shape.
FIG. 9 comprises a plan view (a), a front view (b), a side view (c) and a perspective view (d), showing still another different article shape.
FIG. 10 comprises a plan view (a), a front view (b), a side view (c) and a perspective view (d), showing still another different article shape.
FIG. 11 comprises a plan view (a), a front view (b), a side view (c) and a perspective view (d), showing still another different article shape.
FIG. 12 comprises a plan view (a), a front view (b), a side view (c) and a perspective view (d), showing still another different article shape.

EXPLANATION OF REFERENCE NUMERALS 1 upper/lower attitude sorting apparatus
2 aligning device
3 conveyor (conveyance device)
4 unloading side belt device
5 flat belt
20 round belt (slant member)
40 turntable
50 return conveyor
W different-formed article (confection)

BEST MODES FOR CARRYING OUT THE INVENTION

The present invention will now be described concretely with reference to the drawings. The present invention is not limited to the illustrated modes. As will be shown below, the sorting method and apparatus according to the present invention are for articles having upper and lower portions different in diameter. It is intended to sort articles between those of a normal attitude having an upper side of a small diameter and a lower side of a large diameter and those of an inverted attitude reverse to the articles of the normal attitude. Ordinary type of candies are in many cases slightly tapered from one end toward an opposite end in order to facilitate removal thereof from a molding die, but candies having such a slight taper are actually difficult to be sorted. The present invention is suitably applicable to candies having a difference of 3 mm or more between the outside diameter of one end and that of an opposite end.

Figure 5:
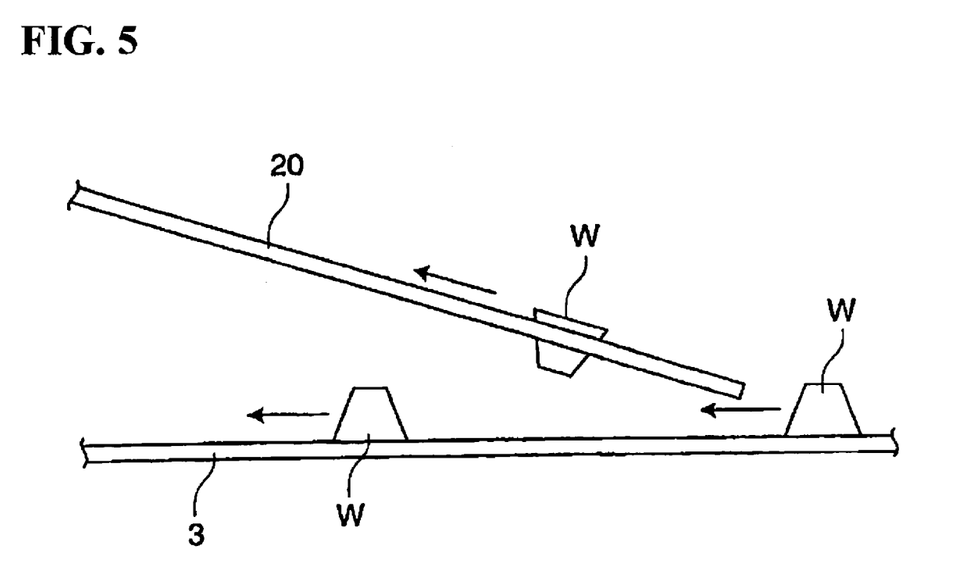
FIG. 5 is an explanatory diagram showing a relation between the article and a sorting belt.

The principle of the sorting method according to the present invention will now be described. As shown in FIG. 5, a pair of slant members 20 which is inclined so as to be low on a start end side and high on a terminal end side are used as sorting members. The pair of slant members are parallel to each other and the spacing between the two is narrower than a maximum diameter of a different-formed article (e.g., candy) and wider than a minimum diameter of the article. The slant members are disposed so as to be lower on the start end than the height of the different-formed article to be sorted.

When an different-formed article W is fed between the pair of slant members 20 while being moved by a conveyor 3 as a conveyance device, it passes as it is between the pair of slant members 20 if the diameter of its upper side is small (normal attitude), whereas if the diameter of its upper side is large (upper and lower attitudes are inverted), it cannot pass between the pair of slant members, then is caught on the pair of slant members 20 and is lifted along the slant. Thus, an article having normal upper and lower attitudes and an article having inverted upper and lower attitudes can be sorted in a simple and positive manner. By using the conveyor 3 such as a belt conveyor as a conveyance device and thereby conveying different-formed articles W continuously to between the slant members, it is possible to perform the sorting work efficiently. Moreover, if sorting belts (e.g., round belts, cord belts, or chains) which travel in the same direction as the article conveyor 3 are used as the pair of slant members 20, sorted articles of abnormal attitude (inverted upper/lower attitudes) can be sent out as they are to another place continuously and thus the use of such belts is convenient.

Figure 1:
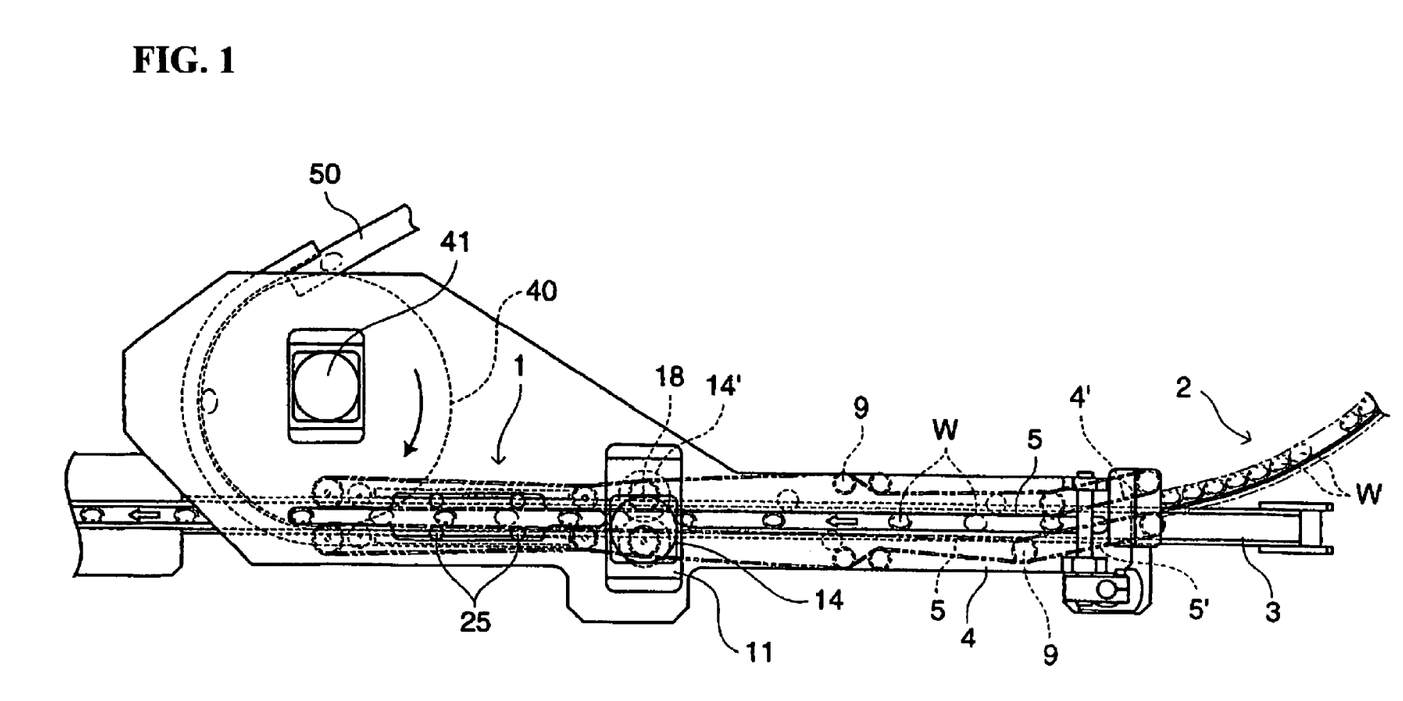
FIG. 1 is a plan view of an upper/lower attitude sorting apparatus.
Figure 2:
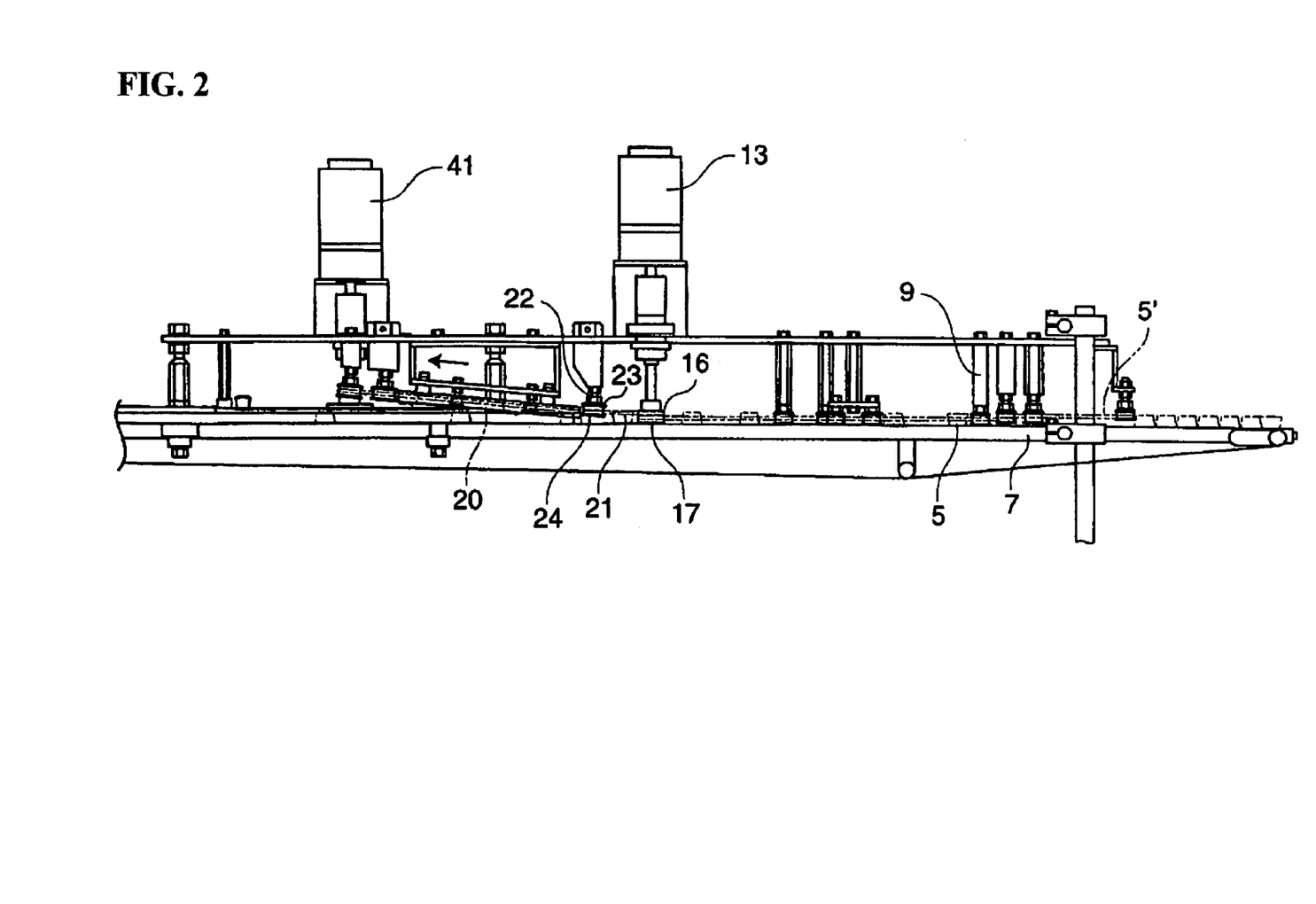
FIG. 2 is a front view thereof.
Figure 3:
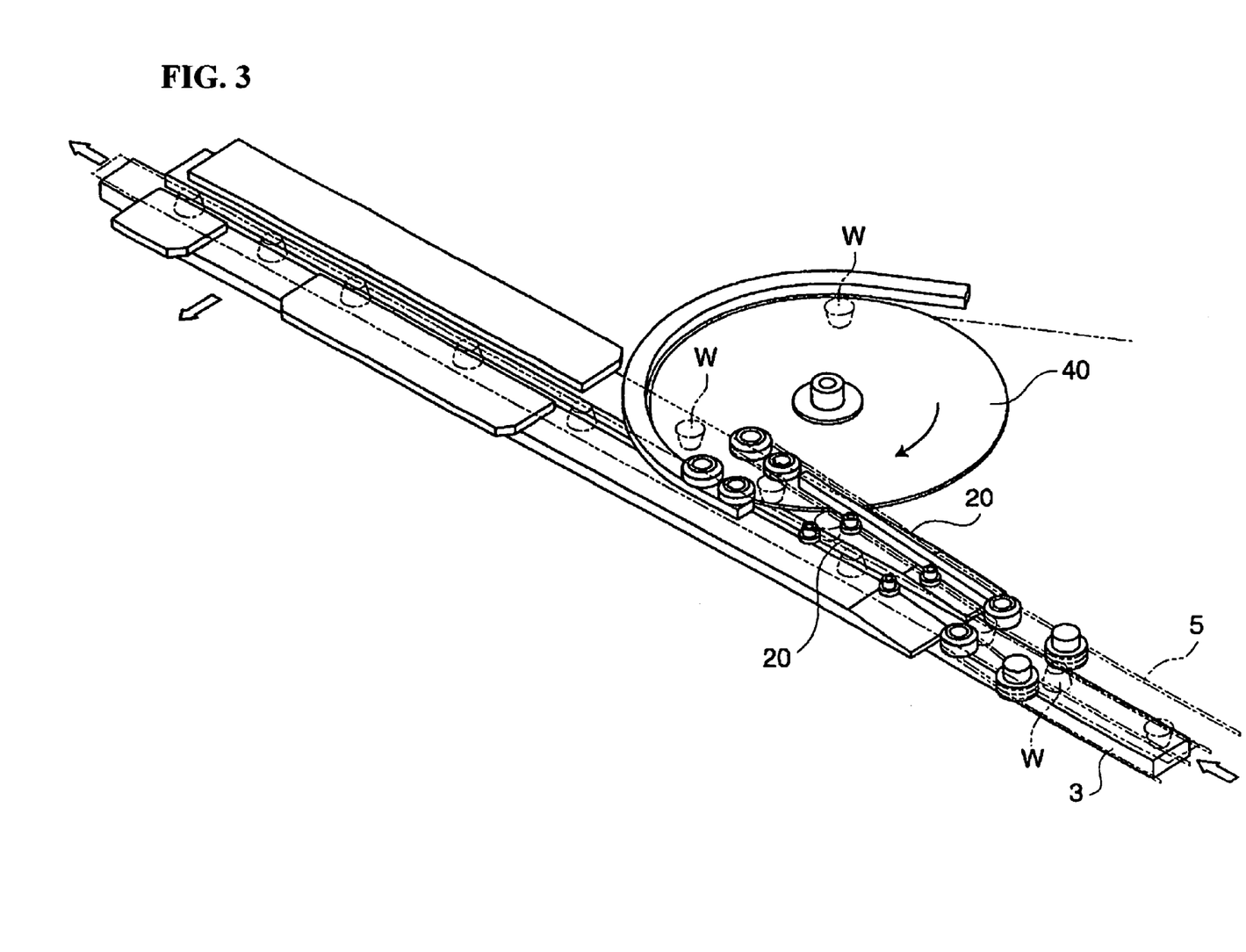
FIG. 3 is a perspective view of a principal portion thereof.
Figure 4:
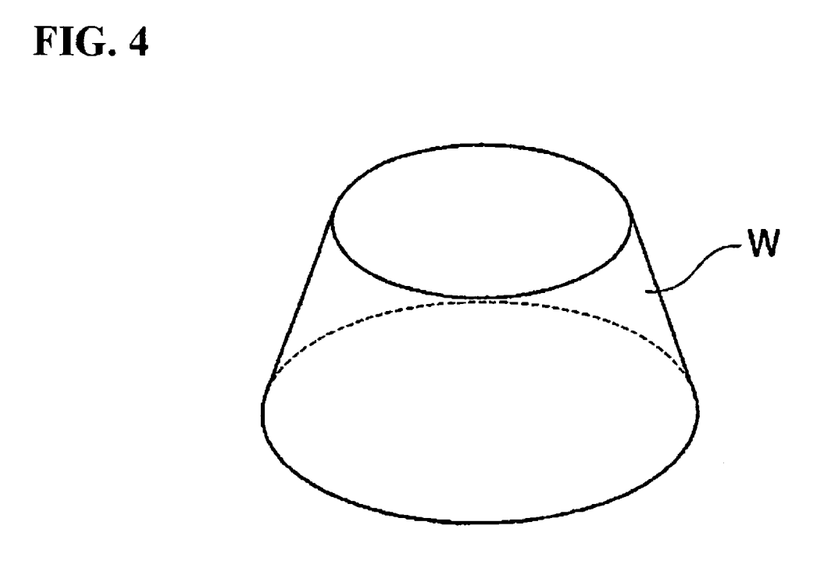
FIG. 4 is an appearance diagram of an article (confection).

Next, a concrete example of the sorting apparatus will be described. The illustrated upper/lower attitude sorting apparatus, indicated at 1, is with an aligning device, etc. attached thereto. It is constructed as an apparatus for sorting out articles whose upper and lower attitudes are inverted from among articles (confections) fed in a row from an aligning device 2 installed on an upstream side. As the aligning device 2 there may be used a known rotary feeder or a vibration type parts feeder. The illustrated aligning device 2 is constituted by a rotary feeder. The aligning device 2 is made up of a circular vessel-like body, as well as an inner slant disc and an outer disc parallel to the inner disc. By rotating the inner disc at a predetermined speed with a motor a large number of articles (confections) W introduced into the body are fed out one after another while retaining a predetermined attitude.

Near an outlet of the rotary feeder type aligning device 2 there are disposed a conveyor 3 as a conveyance device and an unloading side belt device 4 for guiding the articles W fed out from the aligning device onto the conveyor 3. The unloading side belt device 4 is provided with a pair of right and left flat belts 5 as side belts. On a start end side of the unloading side belt device 4 there is provided a guide belt device 4' which connects the outlet of the aligning device 2 and the side belt device 4 with each other, and a pair of right and left flat belts 5' like the flat belts 5 are also provided. A horizontal frame 7 is disposed, extending from the outlet of the aligning device 2 to a rear portion of the upper/lower attitude sorting apparatus 1. By the horizontal frame 7 are supported plural guide rollers 9 rotatably through vertical shafts to guide travel of the flat belts 5 and 5'. At a terminal end portion of the guide belt device 4' there are provided rollers in two upper and lower stages and the flat belts 5' are entrained on the upper roller, while the flat belts 5 are entrained on the lower roller.

A bracket 11 is provided at a longitudinally intermediate position of the frame 7 and a drive motor 13 is installed on the bracket 11. A spur gear 14, as well as two stages of upper and lower driving pulleys 16, 17, are mounted on an output shaft of the motor 13. Further, a spur gear 14' meshing with the spur gear 14 is installed in parallel with the spur gear 14 and a vertical shaft 18 is mounted in the spur gear 14'. Also on the vertical shaft 18 are mounted two stages of upper and lower driving pulleys 16, 17. The flat belts 5 of the side belt device 4 are entrained on the lower driving pulleys 17 out of those two stages of driving pulleys, while round belts 21 for driving the round belts 20 of the upper/lower attitude sorting apparatus 1 are entrained on the upper driving pulleys 16.

The pair of right and left round belts 20 provided in the upper/lower attitude sorting apparatus 1 is sorting belts. A shaft 22 suspended from the frame 7 is disposed on a start end of the belts 20 and two stages of upper and lower guide rollers 23, 24 are supported rotatably on the shaft 22. The driving round belts 21 are entrained on the upper guide roller 23. The spacing between the pair of right and left round belts 20 is set so as to be narrower than the maximum diameter of the articles W on the conveyor 3 and wider than the minimum diameter of the articles. A plurality of somewhat inclined rollers 25 is disposed on a downstream side of the shaft 22. The rollers 25 guide the round belts 20 on the lower guide roller 24 inclinedly so that the downstream side becomes higher gradually. The start end portions of the round belts 20 is at a vertically intermediate level lower than the height of the articles W on the conveyor 3, and a level of the terminal end portions is sufficiently higher than the level of the articles W. The pair of right and left round belts 20 travels circulatively in the arrowed direction synchronously with each other.

A turntable 40 is disposed on a terminal end of the upper/lower attitude sorting apparatus 1 and is rotated in the arrowed direction by a motor 41. Each article W (vertically inverted) which has been carried up to the terminal end while being grippingly held and suspended by the pair of right and left round belts 20 is dropped onto the turntable 40, then with rotation of the turntable, it is fed onto a return conveyor 50. With the return conveyor 50, the article W is sent back to the aligning device 2. The article lifted from the conveyor 3 by the pair of sorting belts 20 may be vertically inverted by a vertically inverting device or manually and conveyed to the succeeding process.

Next, a description will be given about the operation of the upper/lower attitude sorting apparatus 1. In the case where the apparatus 1 is to be used for sorting confections having upper and lower portions different in diameter, a large number of confections W as works are introduced into the rotary feeder as the aligning device. Since the rotary disc of the rotary feeder 2 rotates in a predetermined direction, the confections W introduced into the interior of the rotary feeder are fed gradually to the outlet side along a spiral movement path. At this time, overlapping confections drop inside, so that eventually the confections are fed out while being arranged in a row.

The confections W thus fed out from the rotary feeder 2 are transferred onto the conveyor 3 by the unloading side belt device 4. The confections on the conveyor 3 are conveyed while being arranged in a row without undergoing lateral displacement because they are held grippingly by the right and left flat belts 5.

The confections W fed out from the rotary feeder 2 and being conveyed by the conveyor 3 are arranged in a row, but are in a mixed state of those of normal attitude with a large-diameter portion lying on the lower side and those of inverted attitude with a small-diameter portion lying on the lower side. Therefore, upper and lower attitudes of the confections W are further sorted by the upper/lower attitude sorting apparatus 1 and only those of normal attitude with a large-diameter portion lying on the lower side are fed to the succeeding process, while those of vertically inverted attitude are removed from the upper surface of the conveyor 3 and recycled to the rotary feeder 2.

That is, the confections W having been fed to the upper/lower attitude sorting apparatus B by the conveyor 3 are held grippingly from both right and left sides by the round belts (sorting belts) 20 which are inclined so as to be lower on the start end side than the height of the confections W and higher on the terminal end side than the confections. Besides, the spacing between the right and left round belts 20 is narrower than the large-diameter portion and wider than the small-diameter portion of each confection W. Therefore, a confection W of normal attitude is fed as it is by the conveyor 3, while a confection W of vertically inverted attitude is caught on the right and left round belts 20 because its large-diameter portion lies on the upper side, then is lifted along the slant of the round belts and is removed from the conveyor 3. This vertically inverted confection W is fed onto the turntable 40, then is transferred onto the return conveyor 50 with rotation of the turntable and is recycled to the rotary feeder 2.

The confections thus fed out continuously in a state in which their upper and lower attitudes are arranged orderly are fed out from the conveyor 3 to the succeeding process, e.g., packing process. Since the confections are fed in normal attitude, it is possible to perform counting, inspection and the like in a simple manner.

Figure 6:
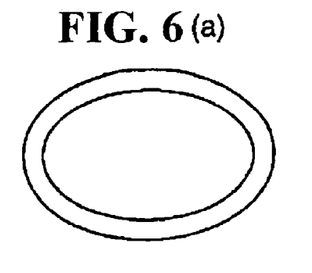
Figure 7:
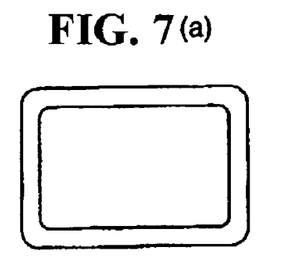
Figure 8:
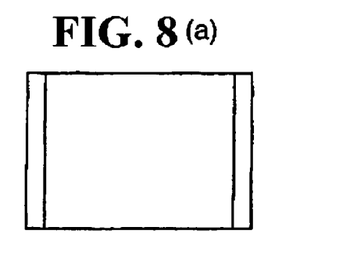
Figure 9:
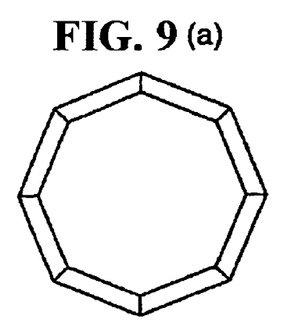
Figure 10:
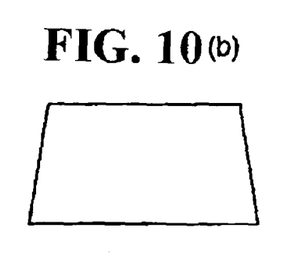
Figure 11:
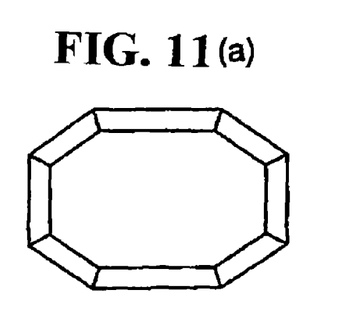
Figure 12A:
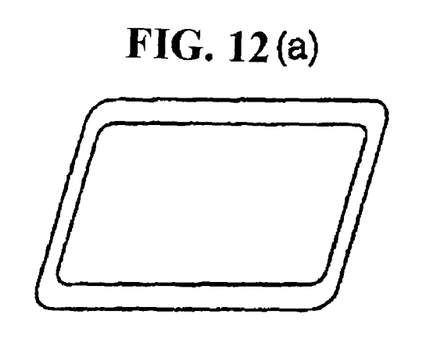
Figure 12B:
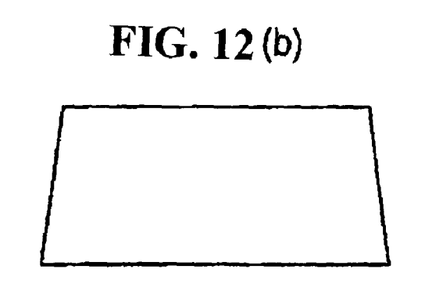
Figure 12C:
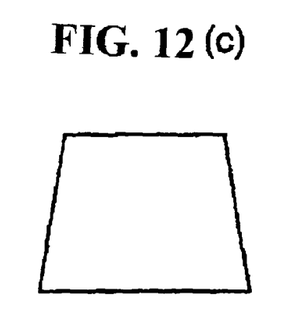
Figure 12D:
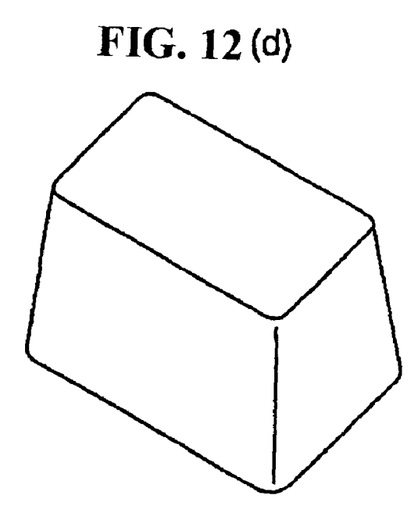

Although in the above description a candy oblong in plan view and trapezoidal in side view is shown as an example of the article W, there are mentioned such articles as shown in FIGS. 6 to 12 as examples of articles such as confections whose upper and lower portions are different in outside diameter. The article shown in FIG. 6 is of the same shape as that of the article referred to in the above description. The article shown in FIG. 7 is quadrangular in plan. The article shown in FIG. 8 is in a generally half-cylindrical shape having both inclined end faces. The article shown in FIG. 9 is octagonal in plan. The article shown in FIG. 10 is circular in plan. The article shown in FIG. 11 is in a polygonal shape having a major diameter and a minor diameter in plan. The article shown in FIG. 12 is rhombic in plan. All of these articles are small in diameter on the upper side and large in diameter on the lower side. Various other shapes of articles are conceivable. The present invention is applicable to such articles having upper and lower portions different in diameter.

As is clear from the above description, the upper/lower attitude sorting apparatus according to the present invention, despite a relatively simple construction, can arrange upper and lower attitudes of articles orderly in a positive manner and feed them continuously. Thus, it is suitable for the conveyance of different-formed articles having upper and lower portions different in diameter. Although in the above description the sorting apparatus is used, as an example, for sorting and conveying confections which are fed out in a row from the aligning device, the sorting apparatus is also applicable to the case where such an aligning device is not provided, but articles are fed one by one onto the conveyor belt by another method. Moreover, it goes without saying that the articles to be sorted are not limited to confections, but may be other articles, including mechanical parts.

Further, although in the above description the normal attitude is assumed to be an attitude wherein a large-diameter portion lies on the lower side and a small-diameter portion lies on the upper side, an attitude wherein an upper portion is large in diameter and a lower portion is small in diameter may be assumed to be the normal attitude. In this case, articles lifted by the slant members may be conveyed as normal articles to a predetermined place.

INDUSTRIAL APPLICABILITY

Since the article upper/lower attitude sorting method and apparatus according to the present invention can orderly arrange upper and lower attitudes of articles having upper and lower portions different in diameter and convey them continuously, they are suitable for use in arranging attitudes of candies or the like orderly and conveying them to for example a packing process in the manufacturing field.

The invention claimed is:

1. A method for sorting articles having upper and lower portions differing in diameter, said method comprising the steps of:
   feeding said articles on a path in which some articles have an orientation with larger diameters away from the path and some have smaller diameters away from the path, between a pair of right and left slant members from a start end of said path on a conveyor, said slant members along said path having a width smaller than a maximum diameter of the articles and larger than a minimum diameter of the articles, said slant members being low on the start end and high on a terminal end along said path, wherein said slant members are a pair of belts running in the same direction as the path;
   catching only the articles having upper portions larger in diameter than respective lower portions on said pair of slant members; and
   allowing the articles having upper portions smaller in diameter than respective lower portions to pass as they are conveyed along said path,
   thereby sorting said articles by diameter orientation.

2. The method according to claim 1, further comprising the steps of:
   aligning said articles in order to be fed to said path; and
   guiding said articles, which have been aligned, to said conveyer.

3. A sorting apparatus for sorting articles of different upper and lower diameters arranged on a path with the lower diameter larger in some cases and smaller in others, the apparatus comprising a conveyor device for conveying the articles in a predetermined direction along the path between a pair of right and left slant members arranged along and over said conveyor device, said pair of right and left slant members being inclined to the path with the height thereof on a start end of said path lower than that of an upper end of each said article on said conveyor device and becoming higher gradually at a terminal end of said path due to being inclined, and the spacing between said pair of right and left slant members being wider than a minimum diameter of the articles conveyed by said conveyor device but narrower than a maximum diameter of the articles, wherein said slant members are a pair of belts running in the same direction as the path.

4. The apparatus according to claim 3, further comprising:
   an alignment device for aligning said articles in order to be fed to the path, and
   an extracting side belt device for guiding said articles, which have been aligned by said alignment device, to said conveyer.

* * * * *

UNITED STATES PATENT AND TRADEMARK OFFICE
CERTIFICATE OF CORRECTION

PATENT NO. : 7,878,335 B2  Page 1 of 1
APPLICATION NO. : 11/922212
DATED : February 1, 2011
INVENTOR(S) : Shigeto Sakou et al.

It is certified that error appears in the above-identified patent and that said Letters Patent is hereby corrected as shown below:

Column 1, following the title, line 3, insert the following paragraph:

--This application is a §371 national phase filing of PCT/JP2006/312560 filed June 16, 2006, and claims priority to Japanese application No. 2005-178635 filed June 17, 2005.--

Signed and Sealed this
Twenty-fourth Day of January, 2012

David J. Kappos
*Director of the United States Patent and Trademark Office*